United States Patent
Smith (10) Patent No.: US 11,347,777 B2
(45) Date of Patent: *May 31, 2022

(54) IDENTIFYING KEY WORDS WITHIN A PLURALITY OF DOCUMENTS

(71) Applicant: International Business Machines Corporation, Armonk, NY (US)

(72) Inventor: Douglas A. Smith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 941 days.

This patent is subject to a terminal disclaimer.

(21) Appl. No.: 15/153,606

(22) Filed: May 12, 2016

(65) Prior Publication Data

US 2017/0329787 A1    Nov. 16, 2017

(51) Int. Cl.
*G06F 16/31*    (2019.01)

(52) U.S. Cl.
CPC ................... *G06F 16/313* (2019.01)

(58) Field of Classification Search
CPC ............... G06F 16/313; G06F 16/9014
See application file for complete search history.

(56) References Cited

U.S. PATENT DOCUMENTS

| | | | | |
|---|---|---|---|---|
| 5,404,514 A * | 4/1995 | Kageneck | ............... | G06F 16/30 |
| 7,130,837 B2 * | 10/2006 | Tsochantaridis | ...... | G06F 16/313 |
| | | | | 706/55 |
| 7,711,737 B2 * | 5/2010 | Surendran | ............. | G06F 16/345 |
| | | | | 707/748 |
| 8,204,842 B1 * | 6/2012 | Zhang | ...................... | G06N 5/02 |
| | | | | 706/45 |
| 8,311,997 B1 * | 11/2012 | Kauchak | ............... | G06F 16/353 |
| | | | | 707/705 |
| 8,645,418 B2 * | 2/2014 | Liu | ......................... | G06F 16/35 |
| | | | | 707/776 |
| 8,825,648 B2 | 9/2014 | Ni et al. | | |
| 9,195,640 B1 * | 11/2015 | Donneau-Golencer | ..................... | |
| | | | | G06F 40/30 |
| 9,201,876 B1 * | 12/2015 | Kumar | .................... | G06F 40/00 |
| 9,916,383 B1 * | 3/2018 | Ching | ................... | G06F 16/316 |
| 2006/0010145 A1 * | 1/2006 | Al-Kofahi | ............. | G06F 16/353 |

(Continued)

OTHER PUBLICATIONS

Donald J. Patterson, Vector Space Scoring: Introduction to Information Retrieval (Year: 2021).*

(Continued)

*Primary Examiner* — Neveen Abel Jalil
*Assistant Examiner* — Hubert Cheung
(74) *Attorney, Agent, or Firm* — Zilka-Kotab, P.C.

(57) ABSTRACT

According to one embodiment, a computer program product for identifying key words within a plurality of documents comprises a computer readable storage medium having program instructions embodied therewith, wherein the computer readable storage medium is not a transitory signal per se, and where the program instructions are executable by a processor to cause the processor to perform a method comprising identifying, by the processor, a first group of textual data, determining, by the processor, a plurality of word combinations within the first group of textual data, and determining, by the processor, a first plurality of key words for the first group of textual data, utilizing the plurality of word combinations.

11 Claims, 6 Drawing Sheets

(56) References Cited

U.S. PATENT DOCUMENTS

| | | | |
|---|---|---|---|
| 2007/0050187 A1* | 3/2007 | Cox | G06F 19/328 704/9 |
| 2007/0282826 A1* | 12/2007 | Hoeber | G06F 16/36 |
| 2009/0177463 A1* | 7/2009 | Gallagher | G06F 16/313 704/10 |
| 2009/0287642 A1* | 11/2009 | Poteet | G06Q 30/02 |
| 2010/0161316 A1* | 6/2010 | Haug | G06F 17/2715 704/9 |
| 2012/0029908 A1* | 2/2012 | Takamatsu | G06F 16/345 704/9 |
| 2012/0095984 A1* | 4/2012 | Wren-Hilton | G06F 16/9535 707/707 |
| 2012/0109932 A1* | 5/2012 | Li | G06F 16/313 707/709 |
| 2012/0179634 A1* | 7/2012 | Chen | G06F 16/35 706/12 |
| 2012/0278341 A1* | 11/2012 | ogilvy | G06F 16/313 707/749 |
| 2013/0339373 A1* | 12/2013 | Patton | G06F 16/90324 707/749 |
| 2014/0201199 A1* | 7/2014 | Hajaj | G06F 16/9535 707/723 |
| 2015/0154305 A1 | 6/2015 | Lightner et al. | |
| 2016/0203221 A1* | 7/2016 | Rao | G06Q 50/01 707/707 |
| 2016/0299955 A1* | 10/2016 | Jain | G06F 16/313 |
| 2017/0060997 A1* | 3/2017 | Lee | G06F 16/3344 |
| 2018/0046629 A1 | 2/2018 | Smith | |

OTHER PUBLICATIONS

List of IBM Patents or Patent Applications Treated as Related.
Non-Final Office Action from U.S. Appl. No. 15/793,865, dated Jun. 28, 2019.
Final Office Action from U.S. Appl. No. 15/793,865, dated Oct. 23, 2019.
Advisory Action from U.S. Appl. No. 15/793,865, dated Feb. 10, 2020.
Non-Final Office Action from U.S. Appl. No. 15/793,865, dated May 15, 2020.
Final Office Action from U.S. Appl. No. 15/793,865, dated Oct. 16, 2020.
Non-Final Office Action from U.S. Appl. No. 15/793,865, dated Apr. 5, 2021.
Final Office Action from U.S. Appl. No. 15/793,865, dated Sep. 8, 2021.
Smith, D., U.S. Appl. No. 15/793,865, filed Oct. 25, 2017.
List of IBM Patents or Patent Applications Treated as Related, Nov. 28, 2017.
Advisory Action from U.S. Appl. No. 15/793,865, dated Oct. 5, 2021.
Notice of Allowance from U.S. Appl. No. 15/793,865, dated Mar. 25, 2022.

* cited by examiner

IDENTIFYING KEY WORDS WITHIN A PLURALITY OF DOCUMENTS

BACKGROUND

The present invention relates to data analysis, and more specifically, this invention relates to determining key words within a plurality of documents.

Key word determination is an important aspect of document analysis and management. When a new group of documents is identified, there may be thousands or millions or more documents within the group that identify various key words that need to be searched and understood. Additionally, the new group may include key words that are not defined. There is therefore a need to analyze and define key words within an identified plurality of documents.

SUMMARY

According to another embodiment, a computer program product for identifying key words within a plurality of documents comprises a computer readable storage medium having program instructions embodied therewith, wherein the computer readable storage medium is not a transitory signal per se, and where the program instructions are executable by a processor to cause the processor to perform a method comprising identifying, by the processor, a first group of textual data, determining, by the processor, a plurality of word combinations within the first group of textual data, and determining, by the processor, a first plurality of key words for the first group of textual data, utilizing the plurality of word combinations.

A system according to another embodiment includes a processor and logic integrated with and/or executable by the processor, the logic being configured to identify a first group of textual data, determine a plurality of word combinations within the first group of textual data, and determine a first plurality of key words for the first group of textual data, utilizing the plurality of word combinations.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for identifying key words within a plurality of documents. Various embodiments provide a method to analyze the plurality of documents to determine key words within those documents and compare the determined key words against additional key words identified within other documents.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying key words within a plurality of documents.

In one general embodiment, a computer-implemented method includes identifying a first group of textual data, determining a plurality of word combinations within the first group of textual data, and determining a first plurality of key words for the first group of textual data, utilizing the plurality of word combinations.

In another general embodiment, a computer program product for identifying key words within a plurality of documents comprises a computer readable storage medium having program instructions embodied therewith, wherein the computer readable storage medium is not a transitory signal per se, and where the program instructions are executable by a processor to cause the processor to perform a method comprising identifying, by the processor, a first group of textual data, determining, by the processor, a plurality of word combinations within the first group of textual data, and determining, by the processor, a first plurality of key words for the first group of textual data, utilizing the plurality of word combinations.

In another general embodiment, a system includes a processor and logic integrated with and/or executable by the processor, the logic being configured to identify a first group of textual data, determine a plurality of word combinations within the first group of textual data, and determine a first plurality of key words for the first group of textual data, utilizing the plurality of word combinations.

Figure 1:
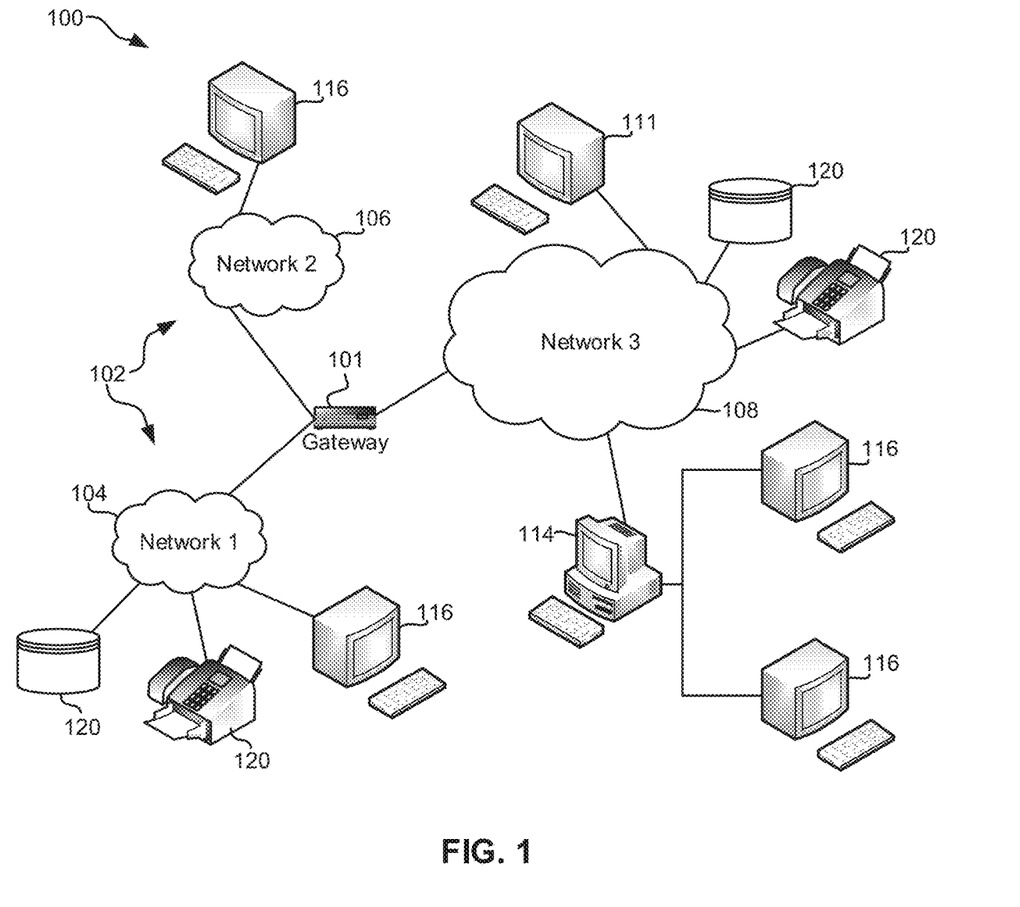
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
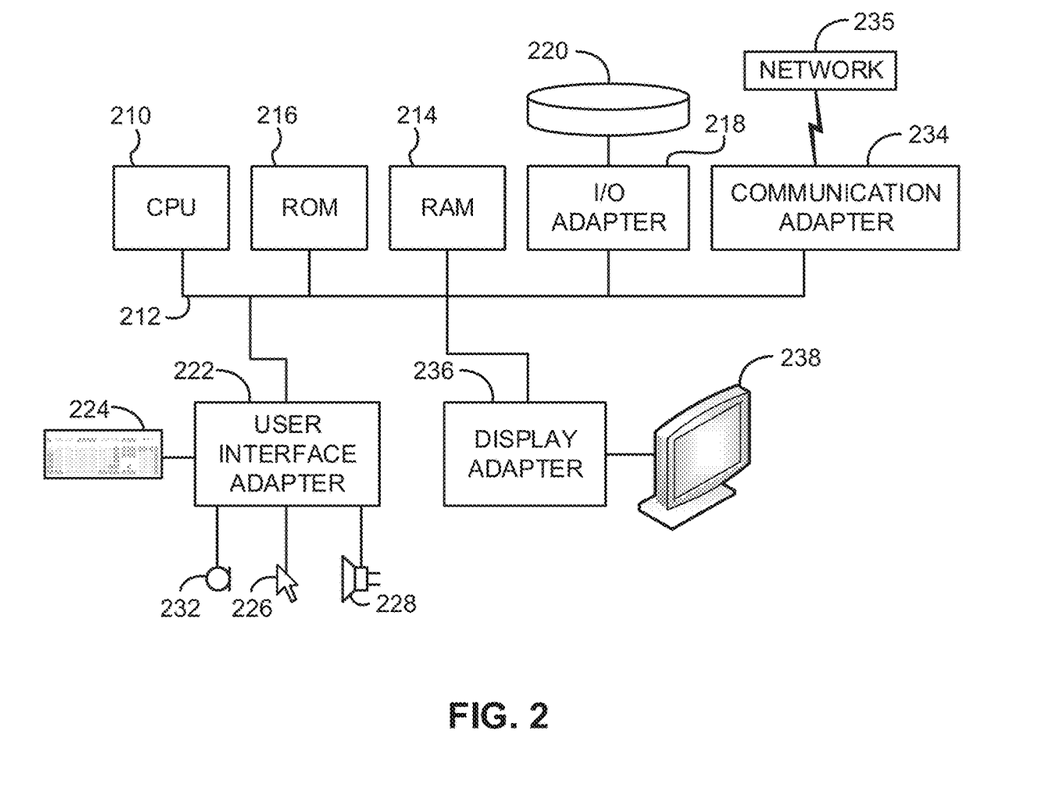
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
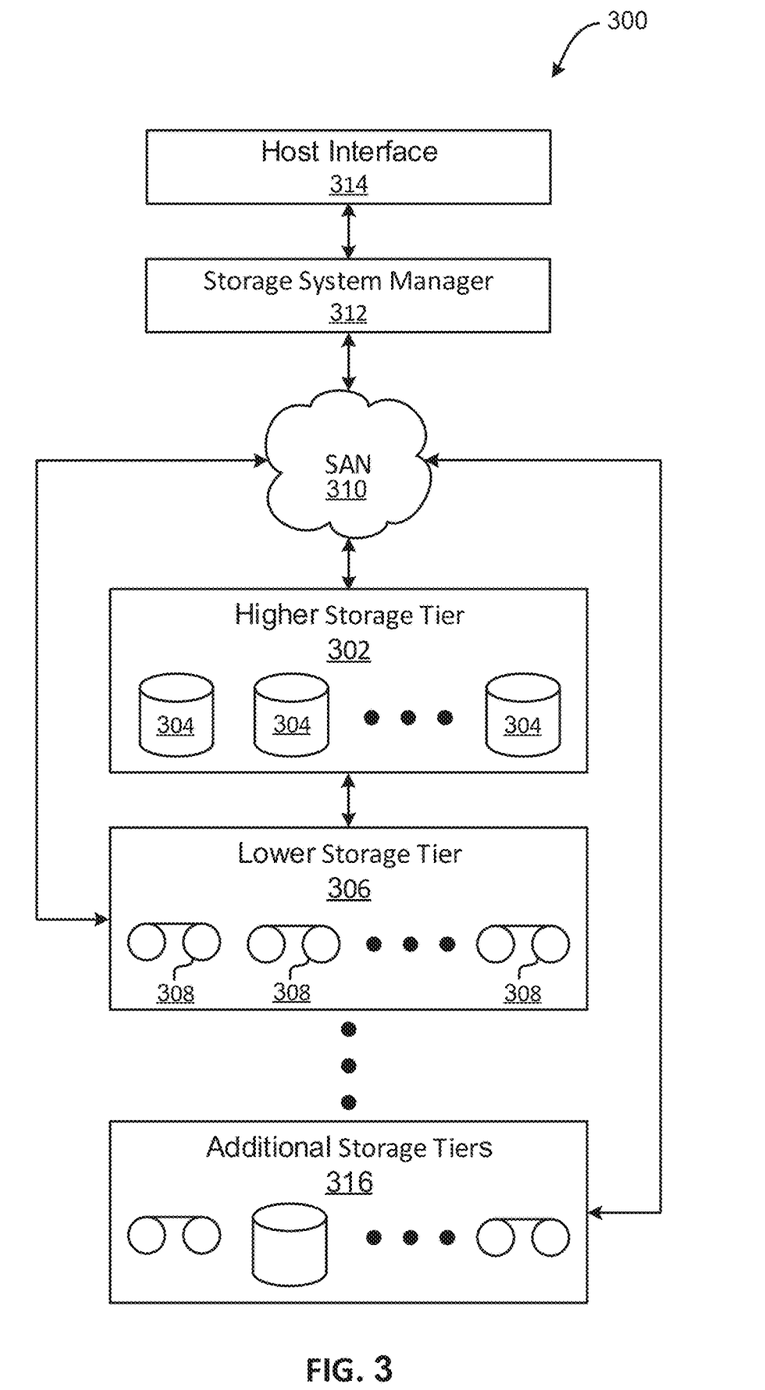
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
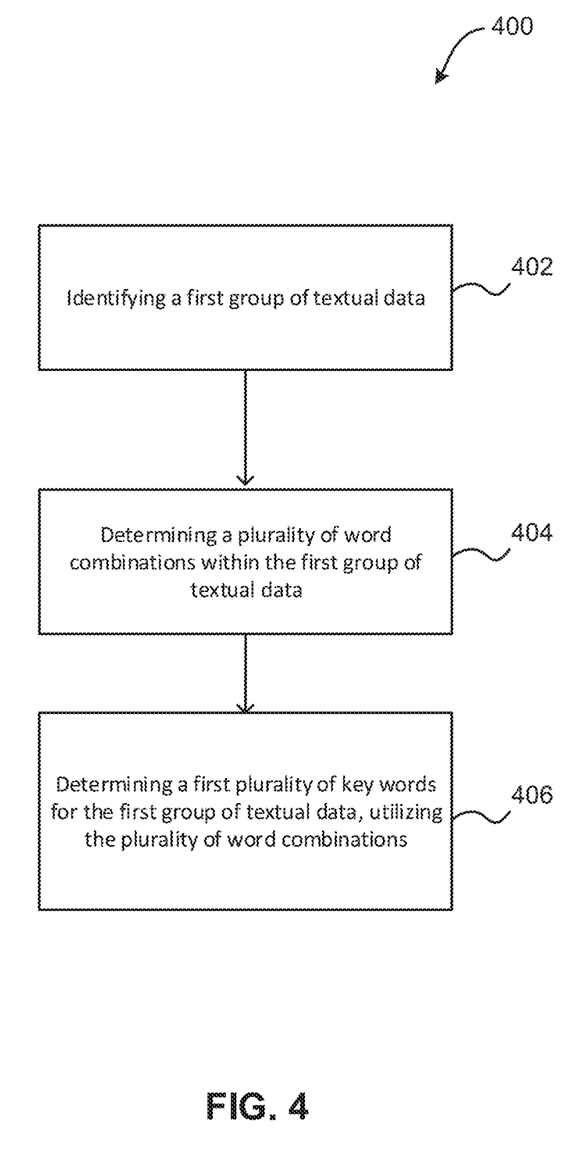
FIG. 4 illustrates a method for identifying key words within a plurality of documents, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a first group of textual data is identified. In one embodiment, a group of textual data may include any corpus, domain, etc. of data that includes one or more textual elements (e.g., one or more alphanumerical characters, words, strings, etc.). For example, the group of textual data may include one or more of a plurality of text documents, a plurality of web page content, a plurality of scanned documents that have undergone character recognition (e.g., optical character recognition (OCR), etc.).

In another embodiment, the first group of textual data may be identified as input. For example, the first group of textual data may be input into one or more analysis modules, where the analysis modules may include one or more computing devices such as one or more servers, one or more personal computers, one or more portable computing devices, one or more cloud computing devices, etc.

Further still, as shown in FIG. 4, method 400 may proceed with operation 404, where a plurality of word combinations are determined within the first group of textual data. In one embodiment, each of the plurality of word combinations may include a grouping of two or more words within the first group of textual data. For example, each of the plurality of word combinations may include a grouping of words that are found adjacent to each other (e.g., within a sentence of the first group of textual data, etc.). In another embodiment, the plurality of word combinations may be determined within the first group of textual data by performing a latent dirichlet allocation (LDA) analysis on the first group of textual data. For example, performing the LDA analysis on the first group of textual data may include performing multiple iterations of Bayesian analysis on the first group of textual data to determine the plurality of word combinations.

Further, in one embodiment, determining the plurality of word combinations within the first group of textual data may include calculating a predetermined number of word combinations that are to be determined for the first group of textual data. In another embodiment, the predetermined number of word combinations that are to be determined may be calculated as a function of the total number of documents within the group of textual data. For example, a predetermined number of key words that are to be determined may be calculated as the square root of (N/2), where N is the total number of documents within the group of textual data. In another example, the predetermined number of word combinations that are to be determined may be calculated as double the predetermined number of key words that are to be determined.

Further still, in one embodiment, determining the plurality of word combinations within the first group of textual data may include performing an LDA analysis on the first group of textual data to determine the predetermined number of word combinations calculated for the first group of textual data. For example, if a total of 100 word combinations are to be determined for the first group of textual data, an LDA analysis including multiple iterations of Bayesian analysis may be performed in order to determine the 100 word combinations that occur most often within the first group of textual data.

Also, in one embodiment, determining the plurality of word combinations within the first group of textual data may include filtering the first group of textual data in order to determine existing word relationships within the first group of textual data. In yet another embodiment, determining the plurality of word combinations within the first group of textual data may include performing Bayesian analysis utilizing the existing word relationships, including assigning a score to each of the existing word relationships and ranking each of the existing word relationships by score within the first group of textual data.

Also, as shown in FIG. 4, method 400 may proceed with operation 406, where a first plurality of key words are determined for the first group of textual data, utilizing the plurality of word combinations. In one embodiment, the first plurality of key words may include the words determined to occur most often within the first group of textual data. In another embodiment, the first plurality of key words may be determined by weighting the words within the plurality of word combinations. For example, each word within the plurality of word combinations may be weighted according to a plurality of factors. In another example, these factors may include a number of different word combinations that the word appears in, a number of times the word appears within the entire group of textual data, a number of times the word appears in a word combination with a large string, etc.

Furthermore, in one embodiment, the first plurality of key words may be determined by ranking the weighted words. For example, the weighted words may be ranked according to weight, where words with a higher weight are ranked higher than words with a lower weight. In another embodiment, the first plurality of key words may include a predetermined number of weighted words. For example, the first plurality of key words may include a predetermined number of the weighted words having the highest weight, highest ranking, etc.

In this way, the first plurality of key words may be indicative of words having the highest importance and/or probability of occurrence within the first group of textual data.

Further still, in one embodiment, the first plurality of key words for the first group of textual data may be compared to a second plurality of key words for a second group of textual data. For example, the second group of textual data may include a separate group of textual data from the first group of textual data. In another embodiment, each of the second plurality of key words may include words that are defined within the at least the second group of textual data. For example, each of the second plurality of key words may have an associated definition within the context of at least the second group of textual data. In another example, the associated definition for each of the second plurality of key words may be stored within one or more databases in association with the associated term (e.g., within a system dictionary, a relational database, etc.). In yet another embodiment, the second plurality of key words may include all key words within a system that contain an associated definition.

Also, in one embodiment, a subset of the first plurality of key words may be identified for the first group of textual data, based on the comparing. For example, the subset may include only words within the first plurality of key words that are not found within the second plurality of key words. In this way, the subset may include key words that are not defined within at least the second group of textual data. In another embodiment, the subset of the first plurality of key words may be identified as unknown terms within the first group of textual data. For example, the subset of the first plurality of key words may be identified as not having an associated definition within the context of at least the second group of textual data.

In this way, key words that are not defined and that have the highest importance and/or probability of occurrence within the first group of textual data may be identified for the first group of textual data. In one embodiment, the subset of the first plurality of key words may be saved in association with the first group of textual data. For example, the subset of the first plurality of key words may be saved within one or more databases and may be linked to the first group of textual data. In another embodiment, a definition may be determined and stored for each of the subset of the first plurality of key words (e.g., within a system dictionary, a relational database, etc.).

Figure 5:
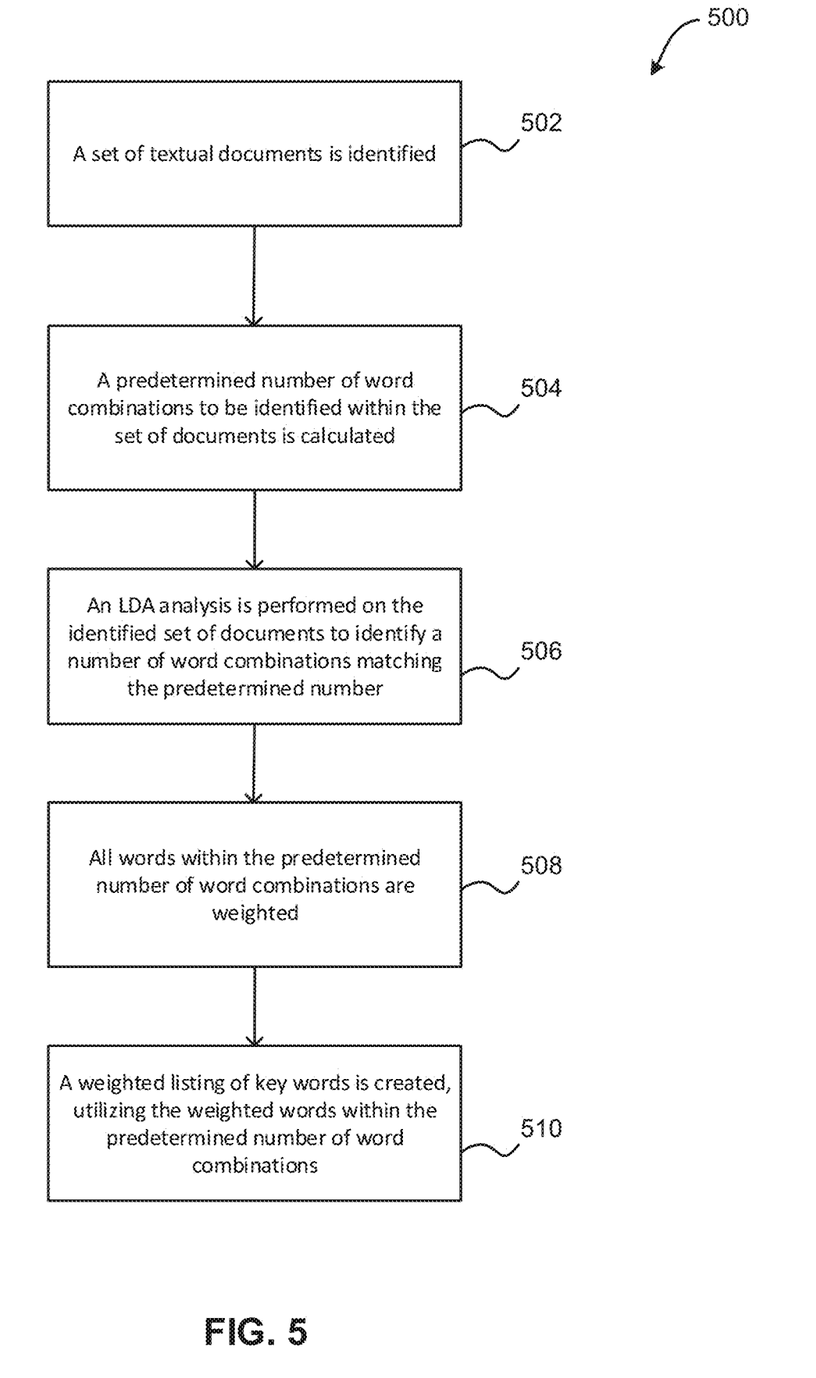
FIG. 5 illustrates a method for creating a weighted listing of key words within a set of documents, in accordance with one embodiment.

Now referring to FIG. 5, a flowchart of a method 500 for creating a weighted listing of key words within a set of documents is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a set of textual documents is identified. In one embodiment, the set of textual documents may include a plurality of documents that each include some textual material. Additionally, method 500 may proceed with operation 504, where a predetermined number of word combinations to be identified within the set of documents is calculated.

Further, method 500 may proceed with operation 506, where an LDA analysis is performed on the identified set of documents to identify a number of word combinations matching the predetermined number. In one embodiment, performing the LDA analysis may include performing multiple instances of Bayesian analysis on the identified set of documents to identify the predetermined number of word combinations, where the predetermined number of word combinations indicate the word combinations occurring the most frequently within the set of documents. For example, the LDA analysis may return a plurality of word combinations along with associated frequencies of those word combinations within the identified set of documents, and a subset of the plurality of word combinations having an associated frequency greater than a threshold amount may by identified within the predetermined number of word combinations.

Further still, method 500 may proceed with operation 508, where all words within the predetermined number of word combinations are weighted. In one embodiment, one or more word relationships may be determined for one or more of the predetermined number of word combinations. In another embodiment, each of the words within the predetermined number of word combinations may be weighted according to how many word combinations the word appears in, a length of a string in which the word appears, etc.

Also, method 500 may proceed with operation 510, where a weighted listing of key words is created, utilizing the weighted words within the predetermined number of word combinations. In this way, the individual strengths of each word within the predetermined number of word combinations may be used to rank the words within the set of textual documents.

In one embodiment, performing the LDA analysis on the identified set of documents may include processing the identified set of documents for analysis to create processed text. In one embodiment, as part of the gathering of textual data, before saving it to local disk, automatic language detection may be performed on the textual data to determine the language of the text. For example, this may be performed using one or more methodologies, such as an open source chromium compact language detection library (CLD), etc.

Additionally, in one embodiment, only documents written in a predetermined language (e.g., English-text documents, etc.) may be saved. In another embodiment, processing the identified set of documents may include stripping the text of the identified set of documents of all words that have no significance in classifying the text. Such words may be referred to as stop words, which, for example, may be words found at a high frequency such as, "a" and "the." If left in, the LDA analysis may have these words as strong in all key word vectors produced, which may mean that the words may have no significance in classifying the text.

Further, in one embodiment, because certain aspects may be used to develop an automatic way to determine words that are diagnostic of a subject, small common words that form the grammar of the language may not be diagnostic of any particular subject. Thus, in another embodiment, these stop words may be stripped from the text of the identified set of documents to increase the significance of the remaining words for classification.

Further still, in one embodiment, processing the text may include stemming one or more words within the text by removing plural or verb conjugation endings. For example, words with separate ends may be analyzed with the same significance. This may be performed using a Lingua::Stem::En module for perl for example. In another embodiment, processing the text may include checking all documents within each subject to remove duplicate documents so the system saves only unique documents. In another embodiment, the order of these documents may then be randomized, and the set may be divided into training and test data with an 80/20 split, for example.

In another embodiment, the LDA analysis may be performed on the processed text to identify a plurality of key word vectors indicative of one or more predetermined subjects. Additionally, in one embodiment, a number of key word vectors may be based on a number of documents within the identified set of documents. For example, a number of key word vectors may equal the square root of half of the number of documents. In another embodiment, the LDA analysis may be performed using a Gensim library for python.

Also, in one embodiment, performing the LDA analysis on the processed text may include reading in and splitting up documents into text words, where only words that existed in two or more documents may be analyzed. In another embodiment, performing the LDA analysis on the processed text may include producing a dictionary of these words, which may provide a unique integer for each word. In another embodiment, performing the LDA analysis on the processed text may include converting the one or more documents into a bag-of-words array, where only the word, represented as an integer, and the number of times it was used is saved. These bag-of-word arrays may then be analyzed using LDA to find the resulting key word vectors.

Further, in one embodiment, to reduce an effect of spam, the key word vectors may be analyzed, such that if one key word vector is determined to use words that are rarely used in other key word vectors, then it is labeled as a bad key word label. In another embodiment, documents containing a predetermined number of words included within vectors having a bad key word label may be removed from the identified set of documents. The LDA analysis may then be repeated, without these removed documents.

Figure 6:
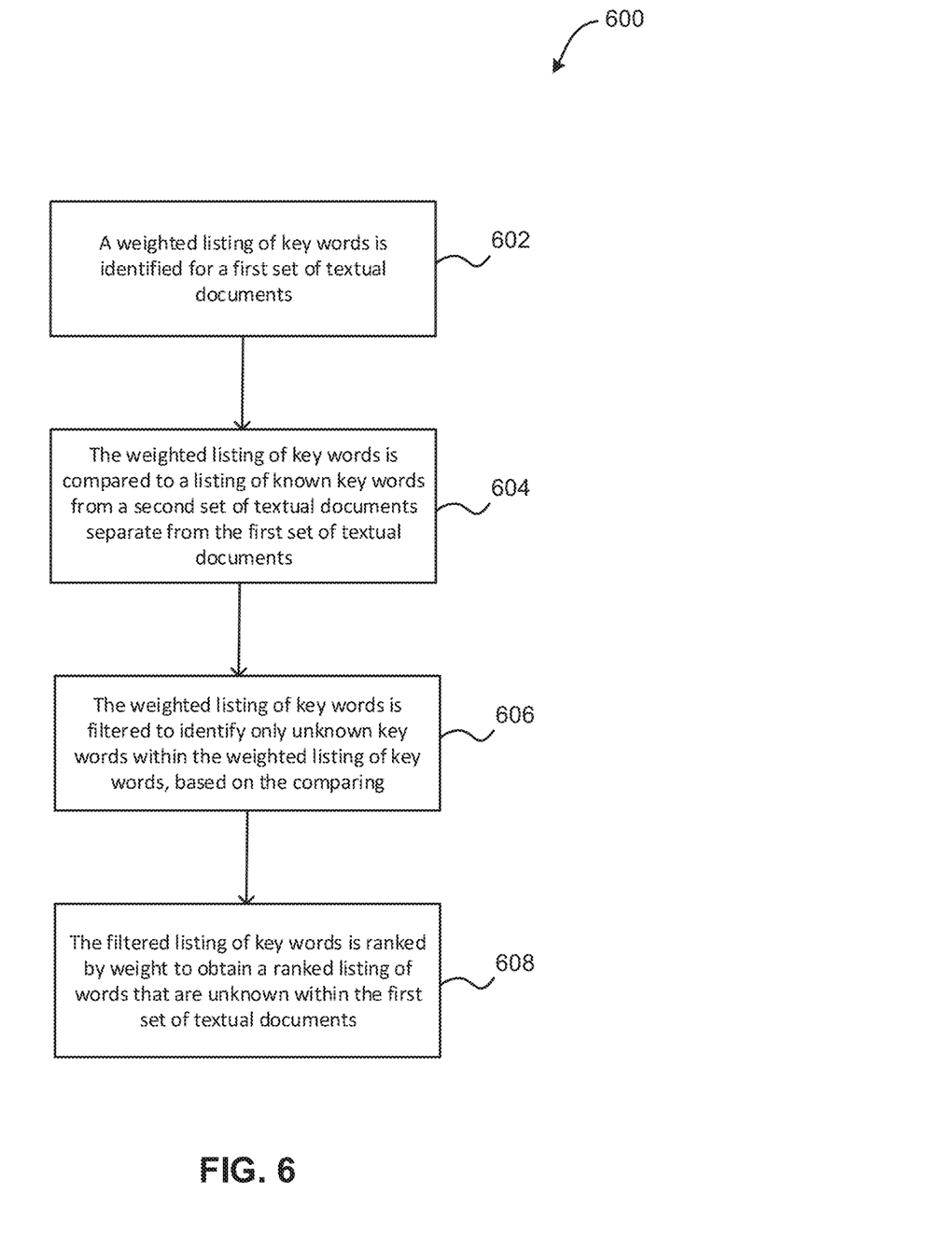
FIG. 6 illustrates a method for filtering a weighted listing of key words, in accordance with one embodiment.

Now referring to FIG. 6, a flowchart of a method 600 for filtering a weighted listing of key words is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a weighted listing of key words is identified for a first set of textual documents. Additionally, method 600 may proceed with operation 604, where the weighted listing of key words is compared to a listing of known key words from a second set of textual documents separate from the first set of textual documents. In one embodiment, the listing of known key words may include a listing of words having existing definitions within a system.

Further, method 600 may proceed with operation 606, where the weighted listing of key words is filtered to identify only unknown key words within the weighted listing of key words, based on the comparing. Further still, method 600 may proceed with operation 608, where the filtered listing of key words is ranked by weight to obtain a ranked listing of words that are unknown within the first set of textual documents. In one embodiment, the filtered listing of key words may be compared against a threshold weight value to create a finalized list of unknown key words. For example, only key words having a weight value above the threshold may be included within the finalized list of unknown key words.

Also, in one embodiment, a definition may be requested for each word within the finalized list of unknown key words. In another embodiment, the definition may be determined for each word within the finalized list of unknown key words, in response to the request. In this way, a general knowledge of the first set of textual documents may be increased most effectively by identifying and then defining the unknown terms that are most likely to occur within the first set of textual documents. Further, a search engine may be trained to identify and define each word within the finalized list of unknown words, such that the performance of future searches by the search engine that are associated with the first set of textual documents may be improved, results may be more relevant, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising one or more computer readable storage media, and program instructions collectively stored on the one or more computer readable storage media, the program instructions comprising instructions configured to cause one or more processors to perform a method comprising:
   identifying, by the one or more processors, a first group of textual data;
   calculating, by the one or more processors, a predetermined number of word combinations that are to be determined for the first group of textual data, wherein the predetermined number is calculated as a function of a total number of documents in the first group of textual data;
   determining, by the one or more processors, the predetermined number of word combinations within the first group of textual data;
   determining, by the one or more processors, a first plurality of key words for the first group of textual data, utilizing the predetermined number of word combinations, including:
      weighting each word within the predetermined number of word combinations according to a plurality of factors including a number of different word combinations within the first group of textual data that include the word to create a plurality of weighted key words,
      ranking the plurality of weighted key words according to weight, and
      selecting a predetermined number of the ranked, weighted key words;
   filtering, by the one or more processors, the first plurality of key words to identify unknown key words within the first plurality of key words; and
   training, by the one or more processors, a search engine to identify and define each of the unknown key words within the first plurality of key words.

2. The computer program product of claim 1, comprising:
   determining and storing, by the one or more processors, a definition for each of the unknown key words within a relational database.

3. The computer program product of claim 1, comprising:
   dividing, by the one or more processors, at least a portion of the documents within the first group of textual data into a training data group and a test data group; and
   training, by the one or more processors, the search engine, utilizing the training data group and the test data group.

4. The computer program product of claim 1, wherein determining the predetermined number of word combinations within the first group of textual data includes filtering the first group of textual data in order to determine existing word relationships within the first group of textual data.

5. The computer program product of claim 1, wherein the plurality of factors includes a number of times the word appears within the first group of textual data and a number of times the word appears in a word combination with a string greater than a predetermined length.

6. The computer program product of claim 1, wherein a predetermined number of word combinations is determined within the first group of textual data, wherein the predetermined number is calculated as a square root of (N/2), wherein N is a total number of documents within the first group of textual data.

7. The computer program product of claim 1, comprising:
   comparing, by the one or more processors, the first plurality of key words for the first group of textual data to a second plurality of key words for a second group of textual data, wherein:
      the first group of textual data is different from the second group of textual data,
      each of the second plurality of key words include words that have an associated definition within the context of the second group of textual data, and
      the associated definitions are stored in association with the second plurality of key words within a relational database;
   identifying, by the one or more processors, a first subset of the first plurality of key words that are not found within the second plurality of key words;
   labelling, by the one or more processors, the first subset of the first plurality of key words as unknown terms within the first group of textual data;
   linking, by the one or more processors, the first subset of the first plurality of key words to the first group of textual data; and
   determining and storing, by the one or more processors, a definition for each of the first subset within a relational database.

8. The computer program product of claim 1, wherein determining the predetermined number of word combinations within the first group of textual data includes performing multiple iterations of Bayesian analysis on the first group of textual data to determine the predetermined number of word combinations.

9. The computer program product of claim 1, comprising:
   performing, by the one or more processors, automatic language detection on the first group of textual data to determine a language of each of the documents within the first group of textual data;
   saving, by the one or more processors, only a subset of the documents within the first group of textual data that are written in a predetermined language;
   identifying and removing, by the one or more processors, all duplicate documents within the first group of textual data;
   removing, by the one or more processors, all stop words from the text of the subset of the documents within the first group of textual data;
   stemming, by the one or more processors, one or more words by removing plural or verb conjugation endings from the words within the text of the subset of the documents within the first group of textual data;
   randomizing, by the one or more processors, an order of the documents within the subset of the documents within the first group of textual data;
   dividing, by the one or more processors, the subset of the documents within the first group of textual data into a training data group and a test data group; and
   training, by the one or more processors, a search engine, utilizing the training data group and the test data group.

10. The computer program product of claim 1, comprising:
   determining, by the one or more processors, a number of key word vectors equaling the square root of half of the total number of documents in the first group of textual data; and
   performing, by the one or more processors, a latent dirichlet allocation (LDA) analysis on the first group of textual data to identify the determined number of key word vectors that are indicative of one or more predetermined subjects, including:

reading, by the one or more processors, in and splitting up documents in the first group of textual data into text words, wherein only words that exist in two or more documents are analyzed, providing, by the one or more processors, a unique integer for each of the text words, utilizing a dictionary, converting, by the one or more processors, the documents within the first group of textual data into a bag-of-words array, wherein only each word, represented as the unique integer, and a number of times it was used is saved, and analyzing, by the one or more processors, the bag-of-words array using the LDA analysis to find the determined number of key word vectors.

11. A system, comprising:

a processor and logic integrated with the processor, executable by the processor, or integrated with and executable by the processor, the logic being configured to:

identify a first group of textual data;

calculate a predetermined number of word combinations that are to be determined for the first group of textual data, wherein the predetermined number is calculated as a function of a total number of documents in the first group of textual data;

determine the predetermined number of word combinations within the first group of textual data;

determine a first plurality of key words for the first group of textual data, utilizing the predetermined number of word combinations, including:

weighting each word within the predetermined number of word combinations according to a plurality of factors including a number of different word combinations within the first group of textual data that include the word to create a plurality of weighted key words, ranking the plurality of weighted key words according to weight, and selecting a predetermined number of the ranked, weighted key words;

filter the first plurality of key words to identify unknown key words within the first plurality of key words; and train a search engine to identify and define each of the unknown key words within the first plurality of key words.

* * * * *